United States Patent [19]
Samaras

[11] Patent Number: 6,092,322
[45] Date of Patent: *Jul. 25, 2000

[54] DECOY WITH MOVING BODY PARTS

[76] Inventor: Greg Samaras, 35-24 209th St., Bayside, N.Y. 11361

[ * ] Notice: This patent issued on a continued prosecution application filed under 37 CFR 1.53(d), and is subject to the twenty year patent term provisions of 35 U.S.C. 154(a)(2).

[21] Appl. No.: 09/116,537

[22] Filed: Jul. 16, 1998

[51] Int. Cl.$^7$ .................................................. A01M 31/06
[52] U.S. Cl. .................................................. 43/2; 446/384
[58] Field of Search .......................... 43/2, 3; 446/384, 446/383, 381, 391, 176, 217, 218; 40/412, 422; 73/170.01

[56] References Cited

U.S. PATENT DOCUMENTS

| | | | |
|---|---|---|---|
| 282,851 | 8/1883 | Danz, Jr. ........................................ | 43/3 |
| D. 325,617 | 4/1992 | Smith ..................................... | D22/125 |
| 2,196,078 | 4/1940 | Pearce .......................................... | 43/3 |
| 2,663,108 | 12/1953 | Dixon et al. ................................. | 43/3 |
| 3,350,808 | 11/1967 | Mitchell ....................................... | 43/3 |
| 3,435,550 | 4/1969 | Carlson ........................................ | 43/3 |
| 3,736,688 | 6/1973 | Caccamo ..................................... | 43/3 |
| 3,916,553 | 11/1975 | Lynch et al. ................................. | 43/3 |
| 3,927,485 | 12/1975 | Thorsnes, Jr. ................................ | 43/3 |
| 4,651,457 | 3/1987 | Nelson et al. ................................ | 43/3 |
| 4,852,288 | 8/1989 | Payne et al. .................................. | 43/2 |
| 4,893,428 | 1/1990 | Gagnon, Sr. ................................. | 43/3 |
| 4,965,953 | 10/1990 | McKinney .................................. | 43/2 |
| 5,036,614 | 8/1991 | Jackson ........................................ | 43/3 |
| 5,144,764 | 9/1992 | Peterson ...................................... | 43/3 |
| 5,168,649 | 12/1992 | Wright ......................................... | 43/2 |
| 5,191,730 | 3/1993 | Balmer ......................................... | 43/3 |
| 5,231,780 | 8/1993 | Gazalski ....................................... | 43/3 |
| 5,274,942 | 1/1994 | Lanius .......................................... | 43/2 |
| 5,279,063 | 1/1994 | Heiges ......................................... | 43/3 |
| 5,289,654 | 3/1994 | Denny et al. ................................ | 43/2 |
| 5,392,554 | 2/1995 | Farstad et al. ............................... | 43/3 |
| 5,393,075 | 2/1995 | Harber ..................................... | 446/176 |
| 5,459,958 | 10/1995 | Reinke ......................................... | 43/2 |
| 5,515,637 | 5/1996 | Johnson ....................................... | 43/2 |
| 5,570,531 | 11/1996 | Sroka ........................................... | 43/3 |
| 5,613,317 | 3/1997 | Ninefar ........................................ | 43/3 |
| 5,636,466 | 6/1997 | Davis ........................................... | 43/3 |

*Primary Examiner*—Peter M. Poon
*Assistant Examiner*—Darren W. Ark
*Attorney, Agent, or Firm*—Wolff & Samson

[57] ABSTRACT

The decoy of the present invention includes a body housing having a front and a rear end, a neck interconnectable with the front end of the body housing, and a head interconnected with the neck. A hook is interconnected with the body housing and a corresponding loop is formed on the neck. The loop can be engaged with the hook to hang the neck and head from the body. A counterweight extends from the neck in the opposite direction of the head to within the body housing to counterbalance the head and neck. The head and neck are free to move up and down and side to side, such movement being caused by naturally occurring wind.

29 Claims, 4 Drawing Sheets

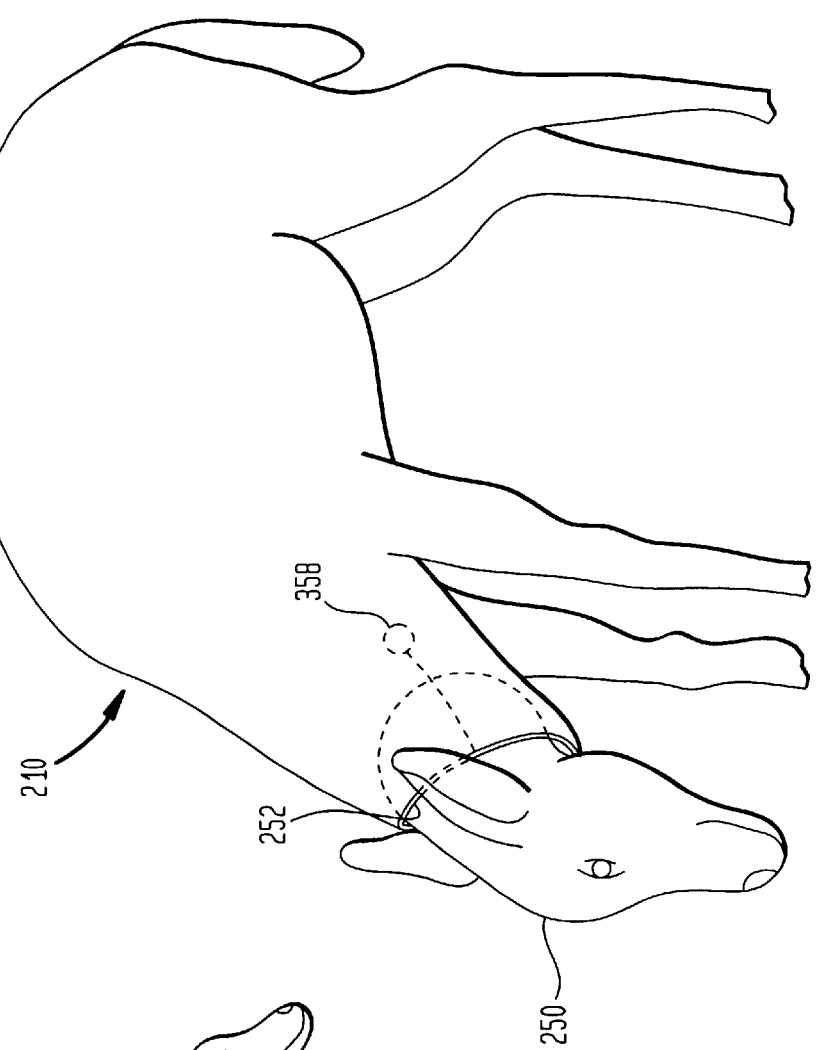
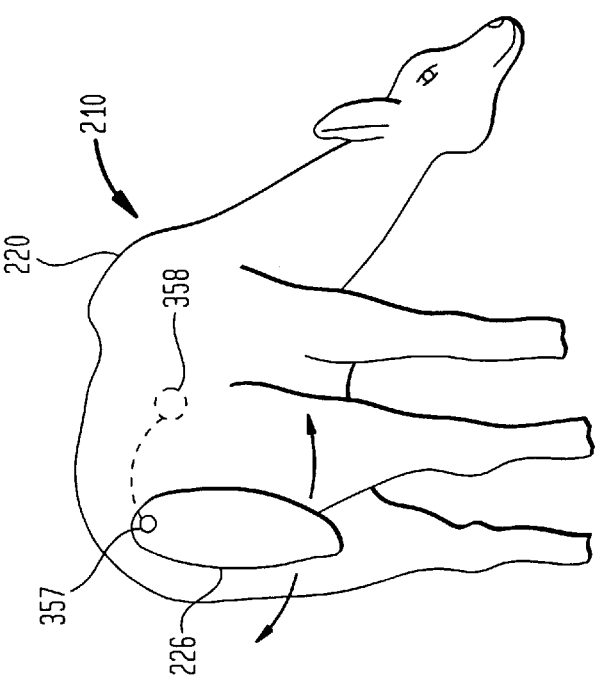
FIG. 4A
FIG. 4B

DECOY WITH MOVING BODY PARTS

BACKGROUND OF THE INVENTION

1. Field of the Invention

The present invention relates to decoys, specifically to animated decoys capable of realistic body part movement. More particularly, the present invention relates to decoys capable of realistic body part movement, wherein a body part is balanced such that a wind causes the body part to move in a realistic manner.

2. Related Art

Decoys are used by hunters to attract prey. A turkey decoy will attract other turkeys. Likewise, a deer decoy will attract deer. The more realistic a decoy, the more likely it is to attract its own species or a predator. Decoys are well known in the prior art. Previous attempts to create a realistic decoys include:

Ninegar, U.S. Pat. No. 5,613,317, discloses wildfowl decoy that moves in response to wind. The device has a body and a head and a flexible neck connecting the head with the body. The impact of wind on the head and neck causes the neck to move. The neck may be constructed of a spring covered with material.

Sroka, U.S. Pat. No. 5,570,531, discloses a decoy having a body, a head and a neck with a flexible connector attaching the head to the body. The connector is bendable and the impact of wind on the head and neck causes the connector to flex. The connector can be used with different types of decoys and can be inserted in varied depths into the neck to achieve various effects.

Johnson, U.S. Pat. No. 5,515,637, discloses a decoy that is moveable by wind. The device includes a rod that extends into the body of the decoy and can be pushed into the ground to support the decoy. The bird is free to rotate about the rod when the wind blows. A helical spring may be formed within the rod or interconnected with the rod to re-store the decoy to a central position and to allow the decoy to tilt.

Heiges, U.S. Pat. No. 5,279,063, discloses a decoy with a flexible neck. The neck can be positioned to a desired location with respect to the body and maintained in such position. The neck may be maintained in a rigid position or it may be allowed to rock.

Lanius, U.S. Pat. No. 5,274,942, discloses a decoy having a pivotally mounted head interconnected with a weight inside the body. The weight normally biases the head to a raised position. A string may be interconnected with the weight to allow for the manual movement of the head and neck.

Gazalski, U.S. Pat. No. 5,231,780, discloses a decoy with rod-like wing supports rotatably mounted to the body which can be operated by pulling a string interconnected therewith. By pulling the string, the wings are moved in a realistic flapping manner. Additionally, the neck and head of the decoy are rotatable and interconnected with the pull string such that pulling the pull string actually is moving the head of the decoy.

Balmer, U.S. Pat. No. 5,191,730, discloses a wing attachment for a bird decoy comprising a flexible material which can be attached to the body of the decoy with velcro. Wind blowing against the flexible material causes movement thereof simulating movement of the decoys wings.

Peterson, U.S. Pat. No. 5,144,764, discloses a decoy with a pair of flexible wings and body. The wings fluctuate in response to air flow. A portion of the body comprises a wind sock to orient the decoy to face the wind.

Gagnon, Sr., U.S. Pat. No. 4,893,428, discloses a decoy having a fin positioned at the tail to act as a rudder to maintain the decoy in position facing the wind.

Nelson, et al., U.S. Pat. No. 4,651,457, discloses a weather vane-type rotatable decoy having a rigid body that can rotate about a rod that can be stuck into the ground at one end to support the decoy.

Caccamo, U.S. Pat. No. 3,736,688, discloses a decoy with moveable, flexible arms which can pivot about a rod to face the wind and which can lock from side to side.

Carlson, U.S. Pat. No. 3,435,550, discloses a decoy having a spring in each wing and may be actuated by a pull string and a swivel mounted in the tail.

Smith, U.S. Pat. No. 325,617, discloses a the ornamental design of a deer tail decoy.

Davis, U.S. Pat. No. 5,636,466, discloses an animal decoy apparatus.

Denny, et al., U.S. Pat. No. 5,289,654, discloses an animated wildfowl decoy.

Payne, et al., U.S. Pat. No. 4,852,288, discloses an articulated wild game decoy.

McKinney, U.S. Pat. No. 4,965,953, discloses a remote controlled turkey decoy.

However, one major drawback with the prior art is that many of the decoys in the prior art require human operation to move a body part of the decoy, such as by the use of a string. This puts the hunter at a major disadvantage in hunting his or her prey. A hunter would better able to hunt his or her prey if he or she had both hands on his or her weapon and kept still, rather than using one hand to move the string or other device to animate the decoy.

Another drawback of the prior art is that even when the decoy does not require human operation to move its head, tail or other body part, movement is usually limited to only up and down motions. This restriction to only vertical body part movement makes the decoy less effective because it does not simulate the natural movement of the animal the decoy is supposed to imitate. The result is prey is less likely to be attracted than by a realistic moving decoy.

Another way of making a decoy, as disclosed in the prior art, is to include electronic controls. However, such electronic controls are frowned upon hunters and are generally not allowed by hunting associations and/or state laws.

Additionally, decoys can be used to scare away undesired animals. A hawk, cat, owl, etc. are examples of such a decoys. Like decoys for attracting prey, the decoys for scaring away animals work better if they similar to the natural movement of real animals. Additionally, decoys can be used for ornaments in such places as gardens.

Accordingly, what is needed, and has not heretofore been developed, is a realistic decoy that simulates realistic movement of the animal, and which movement is caused by the naturally occurring wind at the location that the decoy is to be used.

OBJECTS AND SUMMARY OF THE INVENTION

Accordingly, it is a principle object of the present invention to provide a decoy in which the head and/or tail of the decoy is able to move both horizontally and vertically without human intervention, but rather from just a slight wind.

It is another object of the present invention to provide a decoy in which the moving body part is balanced so the body part moves naturally.

It is an additional object of the present invention to provide a decoy wherein a body part is balanced for movement by a counterweight attached to the body part.

It is even a further object of the present invention wherein a counterweight is interconnected with a moving body part by an arm.

It is even a further object of the present invention to position a counterweight for balancing a moving body part, in the body housing of the decoy.

It is another object of the present invention to provide a decoy with moving body part wherein the body part is capable of movement in vertical and horizontal directions.

It is even another object of the present invention to provide a decoy wherein a hook extends from the body housing, and the head and neck of the decoy has a loop extending therefrom, to hang the body and neck from the housing.

It is another object of the present invention to be able to move more than one body part simultaneously, such as a head and a tail of a decoy.

It is yet another object of the present invention to have support means to support the decoy in a desired location and also to provide for additional movement of the decoy. Specifically, the support means could allow the decoy to move in a plurality of directions.

It is still a further object of the present invention to provide a wide variety of animated realistic looking decoys such as turkeys, deers, hawks, owls, cats, foxes, and wolves (any animal that is needed to be attracted, lured, hunted or scared away).

Broadly stated, the decoy of the present invention comprises a body housing having a front and a rear end, a neck interconnectable with the front end of the body housing, and a head interconnected with the neck. A hook is interconnected with the body housing and a corresponding loop is formed on the neck. The loop can be engaged with the hook to hang the neck and head from the body. A counterweight extends from the neck in the opposite direction of the head to within the body housing to counterbalance the head and neck. The head and neck are free to move up and down and side to side, such movement being caused by naturally occurring wind. A tail can be similarly attached to the body housing for movement by wind.

BRIEF DESCRIPTION OF THE DRAWINGS

Other important objects and features of the invention will be apparent from the following Detailed Description of the Invention taken in connection with the accompanying drawings in which:

FIGS. 4A and 4B are perspective views of other embodiments of the decoy of FIG. 3.

DETAILED DESCRIPTION OF THE INVENTION

Figure 1:
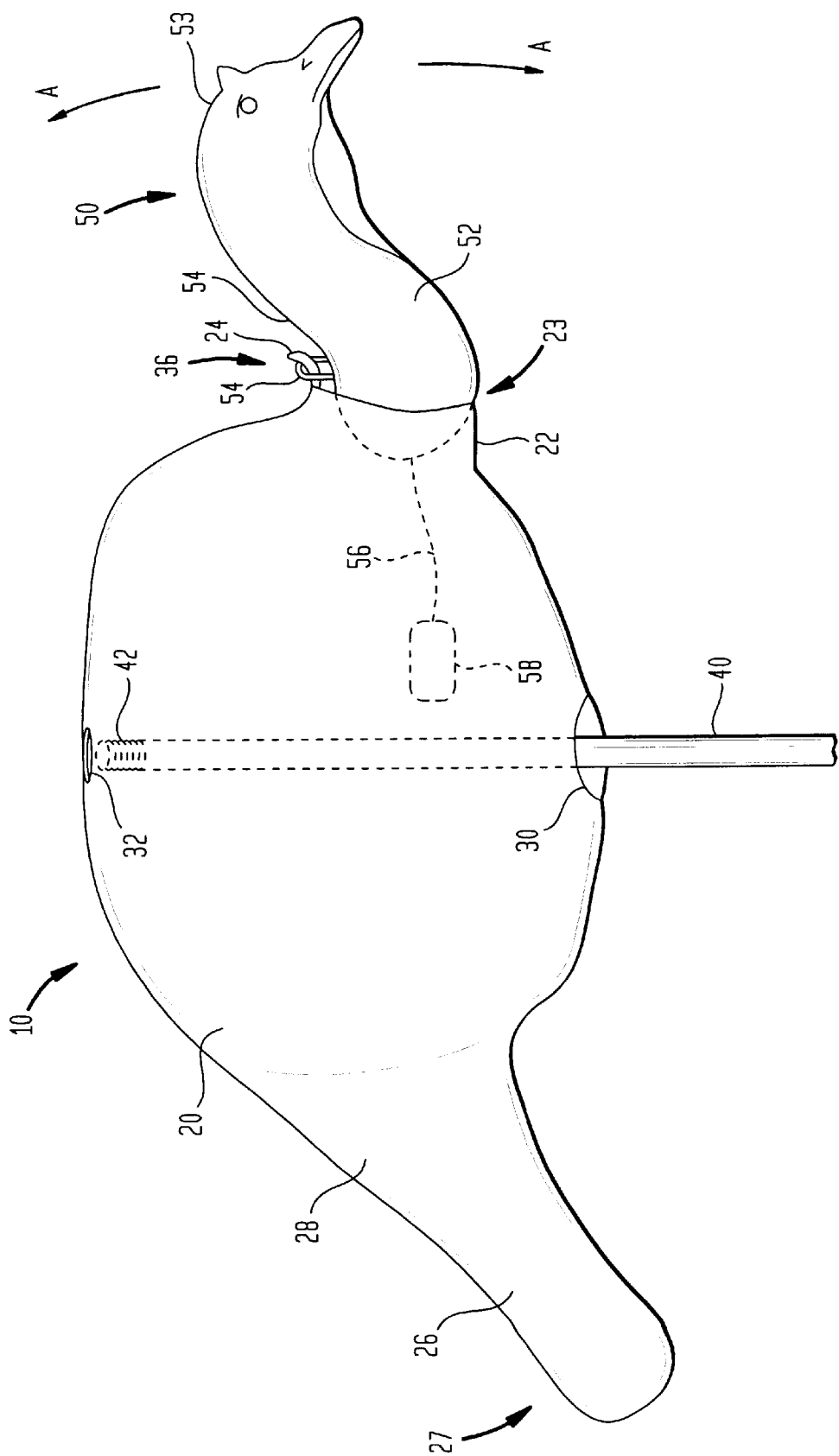
FIG. 1 is a side schematic view of a decoy of the present invention.

Referring to FIG. 1, a decoy is generally indicated at 10. The decoy shown is a turkey decoy. However, this invention applies to any other decoy such as a deer, owl, fox, wolf decoy, etc. The decoy 10 includes a body housing 20 and a head assembly 50. The body housing 20 is hollow on the interior and is shaped and decorated with feathers on the exterior to resemble a turkey from the outside. The head assembly 50 includes a neck 52 and a head 53. The body housing 20 includes a throat area 22 at a front end 23 and a tail 26 at a rear end 27 of the body housing 20. The head assembly 50 is connected to the body housing 20 preferably by a hook and loop assembly 36 as illustrated in FIG. 1. This hook and loop assembly 36 consists of a hook 24 located on an upper portion of the throat area 22 of the body housing 20 and a support loop 54 extending from an upper side of the neck 52. In use, the support loop 54 is positioned on the hook 24 to hang the head assembly 50 from the body housing 20. The head assembly 50 can be attached to the body housing 20 in a feeding position with the head extending toward the ground, or in an upright position with the head extending outward and upward. A portion of the neck 52 extends into the body housing 20 through the throat area 22 of the body housing 20. Importantly, the hook and loop assembly 36 allows for freedom of movement of the head assembly 50 with respect to the body housing 20. Thus, the head assembly 50 can move vertically and horizontally with respect to the body housing 20. Attachment of the head assembly 50 to the body housing 20 in any other way which provides similar freedom of movement is also considered within the scope of the present invention.

A counterweight 58 is provided within the body housing 20. The counterweight 58 is connected to the neck 52 of the turkey decoy 10 by an arm 56. The counterweight 58 is sized and positioned to balance the head assembly 50 on the body housing 20 and to allow for movement of the head assembly 50 with respect to the body housing 20 to simulate movement of a body part of an animal.

FIG. 1 also illustrates a support stake 40 for supporting the decoy 10. The support stake 40 has a support spring 42 attached to a upper end of the support stake 40. The upper end of the support stake 40 extends through a torso aperture 30 in the body housing 20. The support stake 40 is connected to a seat 32 which is attached to an upper part of the body housing 20 within the body housing 20. The stake 40 may be interconnected with seat 32 by the support spring 42. The bottom end of the support stake 40 is pointed and can be pushed into the ground at a desired location to support the decoy 10 at such location. The support spring 42 allows for additional movement of the decoy 10 caused by wind. Other support means as are known in the art may also be used, and can be connected to the body housing 20.

In use, external stimuli such as a slight breeze causes the head assembly 50 of the turkey decoy 10 in FIG. 1 to move up and down and side to side as permitted by the hook and loop assembly 36. The counterweight 58 balances the neck 52 in a neutral position allowing the natural movement of head assembly 50 to continue once movement has been initiated, thereby attracting animals, in this case turkeys. It is preferred that the head assembly 50 be made of light weight material so that only minimal weight will be required to balance the head assembly 50 in a neutral position. As such, even the slightest breeze of wind will cause the head, or other movable body part, to move. However, different head assemblies with varying weight may be used to account for the specific weather conditions.

The present invention also provides for the simulation of moving feathers. In FIG. 1, the feathers on the torso 28 may be made to "strut" or stand up preferably through the use of sheet plastic, which can be blown up by wind. This adds a more realistic appearance to the decoy 10 thereby being more attractive to turkeys.

Figure 2:
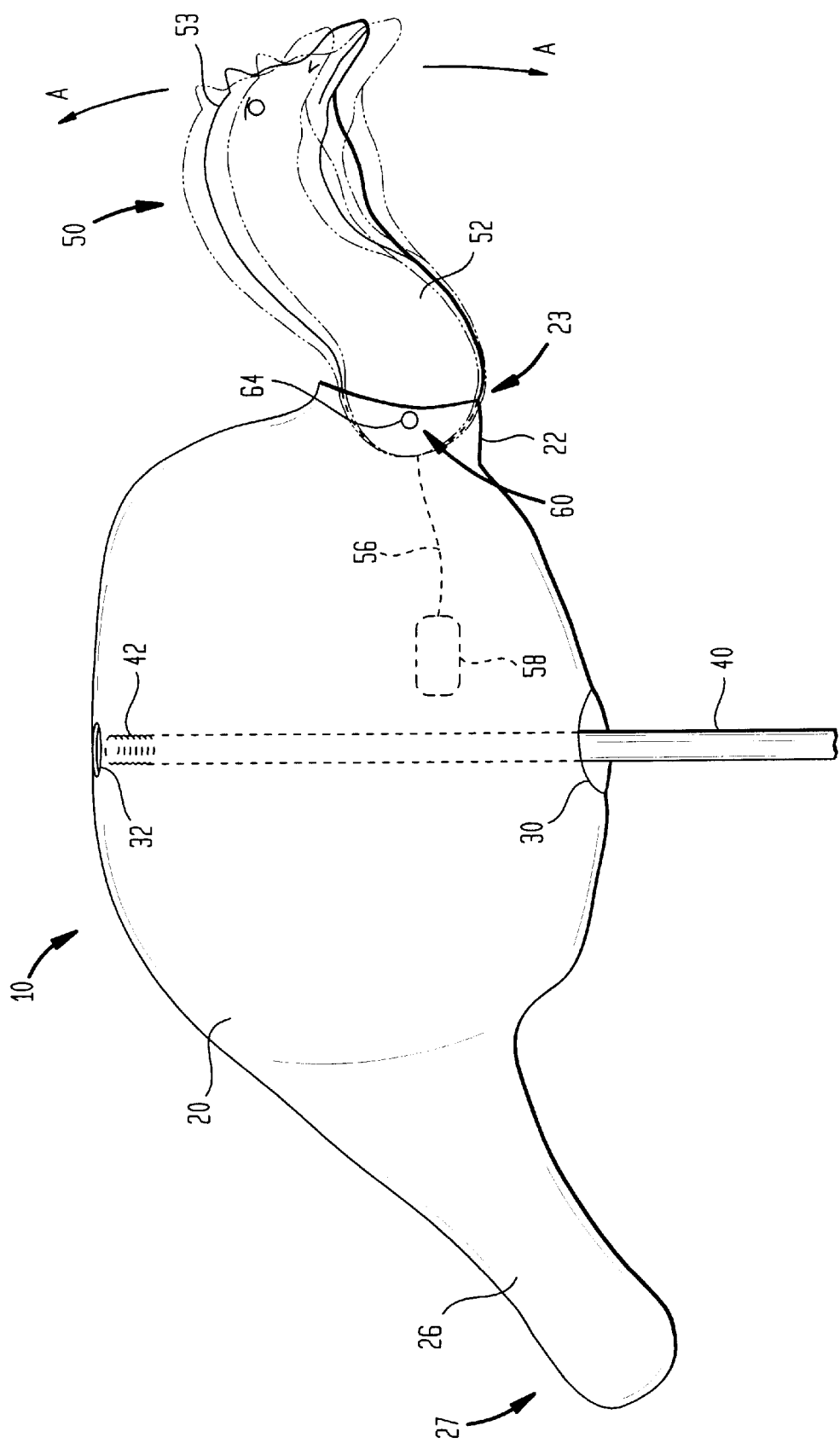
FIG. 2 is a side schematic view of another embodiment of the decoy of FIG. 1.

Another type of attachment means for connecting the head assembly 50 of the decoy 10 to the body housing 20 is a pivot assembly 60 to pivotally connect the head assembly 50 to the body housing 20 as shown in FIG. 2. The pivot assembly 60 comprises a pivot pin 64 which extends through corresponding apertures in opposite sides of the throat area 22 of the body housing 20 and the neck 52. This pivot assembly 60 allows for the head assembly 50 to pivot with respect to the body housing 20 to simulate movement of a decoy's body part. In use, the decoy 10 illustrated in FIG. 2, like the decoy 10 in FIG. 1, has its movement initiated by external stimuli such as wind.

Figure 3:
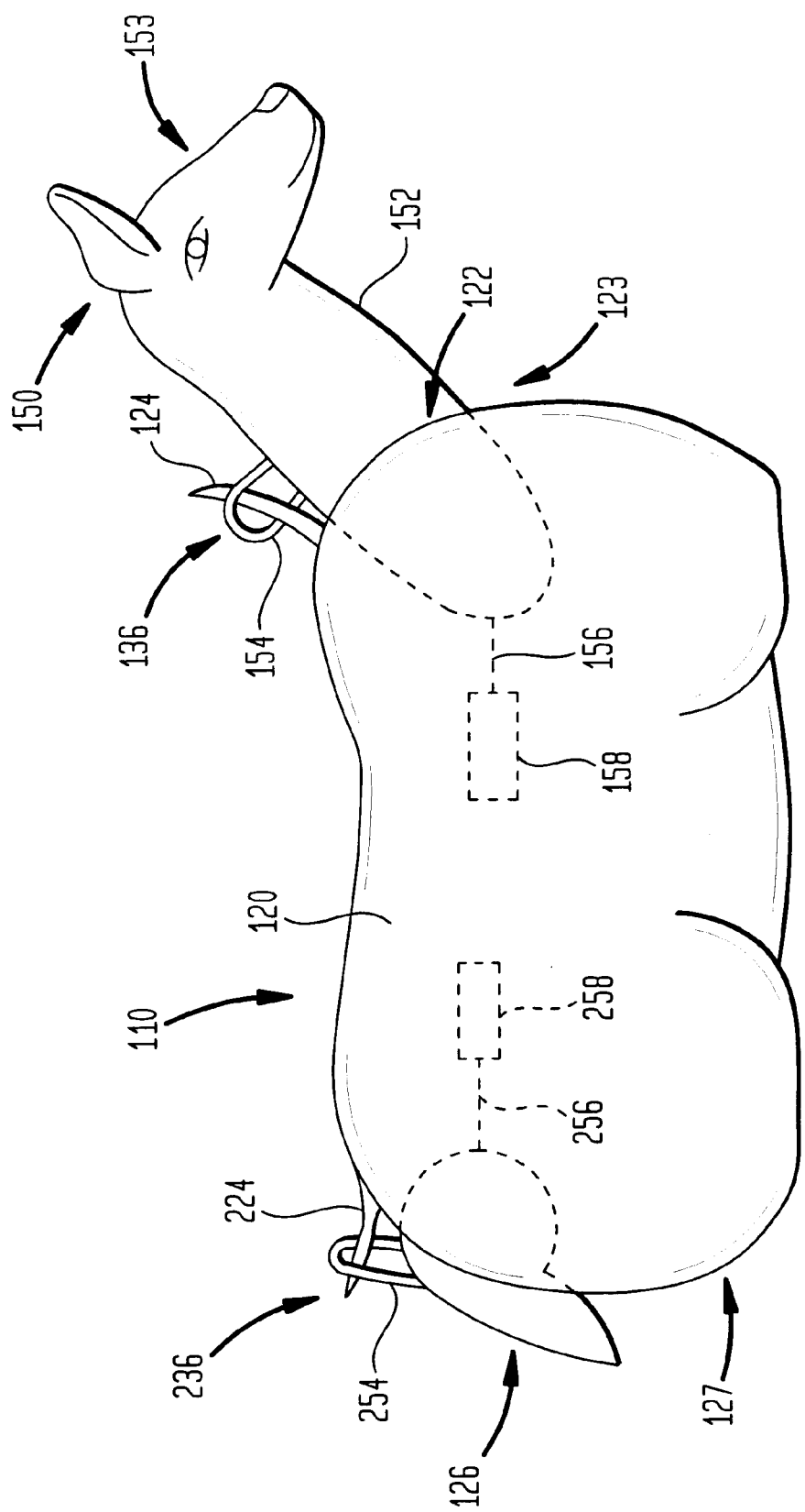
FIG. 3 is a side schematic view of another embodiment of the decoy of FIG. 1.

Referring now to FIG. 3, another embodiment of a decoy according to the present invention is shown. Specifically, in FIG. 3, a deer decoy is generally indicated at 110. In this embodiment, like reference numerals refer to like elements of the previous embodiments. The decoy 110 includes a body housing 120 and a head assembly 150. The body housing 120 is hollow on the inside and is made to resemble a deer from the outside. The head assembly 150 includes a neck 152 and a head 153. The body housing 120 includes a throat area 122 at a front end 123 and a tail 126 at a rear end 127 of the body housing 120. The head assembly 150 of the decoy 110 is connected to the body housing 120 preferably by the hook and loop assembly 136 described above and illustrated in FIG. 1. The hook and loop assembly 136 comprises a hook 124 located on an upper portion of the throat area 122 of the body housing 120 and a support loop 154 located on an upper portion of the neck 152. As shown in FIG. 3, an additional support loop 254 may also be provided on the tail 126 of the decoy 110 and an additional hook 224 may also be provided on the rear end 127 of the body housing 110. As such, the tail 126 hangs on the body housing 120.

In use, the support loop 154 is positioned on the hook 124 to hang the head assembly 150 from the body housing 120. A portion of the neck 152 extends into the body housing 120. In addition, as shown in FIG. 3, the rear support loop 254 on the tail 126 is positioned on the rear hook 224 located on the rear end 127 of the body housing 120 of the decoy 110 to hang the tail 126 from the body housing 120. The hook and loop assembly 136, as shown in FIG. 3, allows the head assembly 150 and the tail 126 to move both vertically and horizontally with respect to the body housing 120. Attachment of the head assembly 150 and tail 126 to the body housing 120 in any other way which provides similar freedom of movement, such as by a pivot means, is also considered within the scope of the present invention.

A counterweight 158, as with the decoy 10 in FIGS. 1 and 2, is also provided within the body housing 120 of the deer decoy 110. The counterweight 158 is connected to the neck 152 by an arm 156 attached to the counterweight 158. A counterweight 258 may also be connected to the tail 126 of the deer decoy by an arm 256. The counterweight 158 or 258 balances the body part to which it is attached to on the body housing and allows for movement of the body part with respect to the body housing 120 to simulate movement of an animal's body part. Accordingly, a slight wind causes the head 150 and/or tail 126 to move with respect to the body housing 120.

Referring now to FIGS. 4A and 4B, another embodiment of the decoy shown in FIG. 3 is shown. In this embodiment, the deer decoy generally indicated at 210, is provided with a body housing 220. A counterweight 358 is interconnected with the neck 252 or tail 226 to balance the body part on the body housing to which the body part is attached and which allows for movement of the body part with respect to the body housing to simulate movement of an animal's body part. A slight wind causes the head 250 and/or tail 226 to move with respect to the body housing 220. Importantly, the tail 226 and/or neck 252 can be attached to the body housing 220 by means of a hook and loop system and/or by means of a pivot system. As shown in FIG. 4A, it is preferable for the tail to move from side to side in a direction shown by arrow D about pivot point 357.

Having thus described the invention in detail, it is to be understood that the foregoing description is not intended to limit the spirit and scope thereof. What is desired to be protected by Letters Patent is set forth in the appended claims.

What is claimed is:

1. A decoy apparatus comprising:

a body housing having a front end and a rear end;

a head assembly interconnected with the front end of the body housing, the head assembly comprising a head and a neck;

connection means for interconnecting the head assembly to the body housing which allows for movement of the head assembly through a range of motion by wind; and counterbalancing means comprising a counterbalancing weight substantially equal to the weight of the head assembly, attached to the head assembly, for balancing the head assembly at an intermediate position along the range of motion with respect to the body housing when the body housing is horizontally positioned, so the head assembly can move along the range of motion in response to wind and without any external force other than gravity.

2. The apparatus of claim 1 wherein the front end of the body housing includes a throat area, and the connection means comprises a hook extending from an upper portion of the throat area and a loop located on an upper surface of the neck, the loop being positioned on the hook to hang the head assembly from the body housing.

3. The apparatus of claim 1 wherein the front end of the body housing includes a throat area and the connection means comprises a pivot pin extending through corresponding apertures in opposite sides of the throat area of the body housing and the neck, the pivot pin pivotally connecting the head assembly to the body housing.

4. The apparatus of claim 1 wherein the counterbalancing weight is connected to the neck by an arm.

5. The apparatus of claim 4 wherein the counterbalancing weight is positioned within the body housing.

6. The apparatus of claim 1 further comprising a support stake having an upper end and a lower end, the upper end of the support stake extending into the body housing through a torso aperture in the body housing.

7. The apparatus of claim 6 further comprising a spring attached to the upper end of the support stake against a seat attached to an upper portion of the body housing within the body housing to allow for additional movement of the decoy in a plurality of directions.

8. The apparatus of claim 1 wherein a sheet of plastic is attached to the body housing which can be blown up by wind to simulate the strutting of feathers.

9. The apparatus of claim 1 further comprising:

a tail interconnected with the rear end of the body housing;

connecting means for connecting the tail to the body housing; and a counterweight interconnected with the tail by a second arm attached to the tail, the second counterweight positioned within the body, the second counterweight balancing the tail.

10. The apparatus of claim 9 wherein the connection means for interconnecting the head assembly to the body housing compromises a hook located on an upper portion of the body housing and a loop connected to an upper side of the neck, the loop positioned on the hook to hang the head assembly from the body housing and allow for both horizontal and vertical movement of the head assembly with respect to the body housing.

11. The apparatus of claim 10 wherein the connecting means for connecting the tail to the body comprises a rear hook extending from the rear end of the body housing and a rear loop attached to the tail, the rear loop positioned on the rear hook to hang the tail from the body housing and allow for both horizontal and vertical movement of the tail with respect to the body housing.

12. The apparatus of claim 9 wherein the connection means for interconnecting the head assembly to the body housing is a pivot assembly comprising a pivot pin extending through corresponding apertures in opposite sides of the body housing and the neck, the pivot pin pivotally connecting the head assembly to the body housing and allowing for movement of the head assembly relative to the body housing from a slight breeze.

13. The apparatus of claim 12 wherein the connecting means for connecting the tail to the body is a pivot assembly comprising a second pivot pin extending through corresponding apertures in opposite sides of the rear end of the body housing and the tail, the second pivot pin pivotally connecting the tail to the body housing and allowing for movement of the tail relative to the body housing even from a slight breeze.

14. The apparatus of claim 1 wherein the counterbalancing weight comprises a weighted arm.

15. The apparatus of claim 1 wherein the counterbalancing weight comprises an arm interconnected with the neck at one end and with a weight at the opposite end.

16. The apparatus of claim 1 wherein the head assembly can move from the intermdiate position, forward or rearward along the range of motion.

17. A decoy apparatus comprising:
a body housing with a front end and a rear end;
a tail assembly interconnected with the rear end of the body housing;
connection means connecting the tail assembly to the body housing which allows movement of the tail assembly through a range of motion by wind; and
counterbalancing means comprising a counterbalancing weight substantially equal to the weight of the tail assembly, attached to the tail assembly, for balancing the tail assembly at an intermediate position along the range of motion with respect to the body housing when the body housing is in a horizontal position.

18. A decoy apparatus comprising:
a body housing having a front end and a rear end;
a head assembly interconnected with the front end of the body housing, the head assembly comprising a head and a neck;
connection means for connecting the head assembly to the body housing which allows for movement of the head, by wind, both up and down and side to side with respect to the body housing; and
counterbalancing means including an arm connected to the neck at one end, and a weight at the opposite end for balancing the head assembly with respect to the body housing at the connection means.

19. The apparatus of claim 18 wherein the front end of the body housing includes a throat area, and the connection means comprises a hook extending from an upper portion of the throat area and a loop located on an upper surface of the neck, the loop being positioned on the hook to hang the head assembly from the body housing.

20. The apparatus of claim 18 wherein the counterweight is positioned within the body housing.

21. The apparatus of claim 18 further comprising a support stake having an upper end and a lower end, the upper end of the support stake extending into the body housing through a torso aperture in the body housing.

22. The apparatus of claim 21 further comprising a spring attached to the upper end of the support stake against a seat attached to an upper portion of the body housing within the body housing to allow for additional movement of the decoy in a plurality of directions.

23. The apparatus of claim 18 wherein a sheet of plastic is attached to the body housing which can be blown up by wind to simulate the strutting of feathers.

24. A method for using a decoy to attract or scare away animals comprising the steps of:
forming a hollow decoy housing with an open front end;
attaching a hook to the housing above the open front end;
forming a head and neck assembly comprising a head and a neck;
attaching a loop to the neck;
attaching a counterweight, by means of an arm, to the head and neck assembly to balance the head and neck assembly in a neutral position;
hanging the head and neck assembly from the housing by placing the loop on the hook;
placing the decoy at a desired location to attract animals; and
allowing the wind to move the head and neck assembly of the decoy.

25. The method of claim 24 further comprising the step of interconnecting the decoy with a support stake having a pointed edge for insertion into the ground to position the decoy at a desired location.

26. The method of claim 25 wherein the decoy is a fowl and the method further comprises attaching a plastic sheet decorated to resemble feathers to the housing such that wind will blow up the feathers to create the effect of strutting.

27. The method of claim 25 further comprising the steps of attaching a spring to an upper portion of the support stake, attaching a seat to an upper part of the body housing within the body housing, and placing the upper part of the support stake inside the body housing through an aperture in a bottom portion of the body housing.

28. The method of claim 24 wherein the decoy is an animal and the method further comprises attaching a rear hook to a rear end of the body housing, forming a tail, attaching a rear loop to the tail, and hanging the tail from the body housing by placing the loop on the hook.

29. The method of claim 28 further comprising the step of attaching a second counterweight to the tail by means of an arm.

* * * * *

US006092322C1

(12) EX PARTE REEXAMINATION CERTIFICATE (7432nd)
United States Patent
Samaras

(10) Number: US 6,092,322 C1
(45) Certificate Issued: Mar. 30, 2010

(54) DECOY WITH MOVING BODY PARTS

(75) Inventor: Greg Samaras, 35-24 209th St., Bayside, NY (US) 11361

(73) Assignee: Greg Samaras, Bayside, NY (US)

Reexamination Request:
No. 90/008,960, Feb. 4, 2008

Reexamination Certificate for:
Patent No.: 6,092,322
Issued: Jul. 25, 2000
Appl. No.: 09/116,537
Filed: Jul. 16, 1998

(51) Int. Cl.
*A01M 31/06* (2006.01)

(52) U.S. Cl. .............................................. 43/2; 446/384
(58) Field of Classification Search ......................... None
See application file for complete search history.

(56) References Cited

U.S. PATENT DOCUMENTS

| 2,128,326 | A | 8/1938 | Rubenstein |
| 2,181,024 | A | 11/1939 | Pifalo |
| 2,277,672 | A | 3/1942 | Stone |
| 2,786,303 | A | 3/1957 | Zimmerman |
| 3,465,474 | A | 9/1969 | Gardel |

FOREIGN PATENT DOCUMENTS

GB          2131266          11/1982

OTHER PUBLICATIONS

Smith, Leonora M., Nodders, 1973, 4 pages, Wallace–Homestead Co., Des Moines, Iowa 50305, U.S.A.
Irtz, Hilma R., Figural Nodders Identification & Value Guide Includes Bobbin' Heads and Swayers, 1997, p. Nos. 7–14, 100, 104, 120–122, 125, 127, 134, 150, 222–223, Image Graphics, Paducah, Kentucky.
Vintage Classix, Florenza Pink Turtle Nodder Pin Cushion, Collectibles: Vintage ; Florenza Needelwork, Ruby Lane, 1998, 6 pages.
1960s Exxon Esso Advertising Tiger in Tank Nodder Toy, Ebay, Apr. 7, 2005, 5 pages.
Vintage Nodder Made in Germany US Zone Excellent, Ebay, Aug. 9, 2007, 2 pages.
Vintage Occupied Japan Celluloid Nodder and Windup Toys, Ebay, Aug. 8, 2007, 2 pages.
Falkys Treasures, 2 pair Bobble Heads or Nodders Swan and Turtle, Ruby Lane, 1998, 2 pages.

*Primary Examiner*—Jeffrey L. Gellner

(57) ABSTRACT

The decoy of the present invention includes a body housing having a front and a rear end, a neck interconnectable with the front end of the body housing, and a head interconnected with the neck. A hook is interconnected with the body housing and a corresponding loop is formed on the neck. The loop can be engaged with the hook to hang the neck and head from the body. A counterweight extends from the neck in the opposite direction of the head to within the body housing to counterbalance the head and neck. The head and neck are free to move up and down and side to side, such movement being caused by naturally occurring wind.

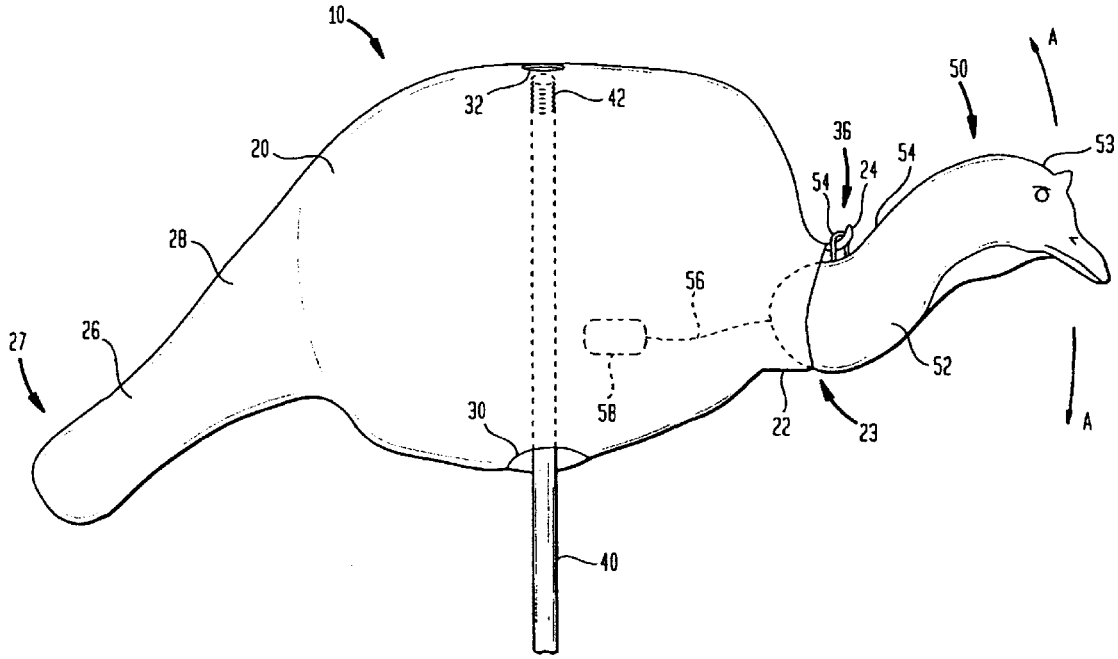

US 6,092,322 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–29 are cancelled.

New claims 30–60 are added and determinded to be patentable.

30. *A decoy apparatus comprising:*
   *a body housing having a front end and a rear end;*
   *a head assembly interconnected with the front end of the body housing, the head assembly comprising a head and a neck;*
   *connection means for interconnecting the head assembly to the body housing which allows for movement of the head assembly through a range of motion by wind, the connection means is a selectively connectable connection means allowing the head to be selectively connected and removed from the body housing; and*
   *counterbalancing means comprising a counterbalancing weight substantially equal to the weight of the head assembly, attached to the head assembly, for balancing the head assembly at an intermediate position along the range of motion with respect to the body housing when the body housing is horizontally positioned, so the head assembly can move along the range of motion in response to wind and without any external force other than gravity.*

31. *The apparatus of claim 30 wherein the front end of the body housing includes a throat area and the connection means comprises a pivot pin extending through corresponding apertures in opposite sides of the throat area of the body housing and the neck, the pivot pin pivotally connecting the head assembly to the body housing.*

32. *The apparatus of claim 30 wherein the counterbalancing weight is connected to the neck by an arm.*

33. *The apparatus of claim 32 wherein the counterbalancing weight is positioned within the body housing.*

34. *The apparatus of claim 30 wherein a sheet of plastic is attached to the body housing which can be blown up by wind to simulate the strutting of feathers.*

35. *The apparatus of claim 30 further comprising:*
   *a tail interconnected with the rear end of the body housing;*
   *connecting means for connecting the tail to the body housing; and*
   *a counterweight interconnected with the tail by a second arm attached to the tail, the second counterweight positioned within the body, the second counterweight balancing the tail.*

36. *The apparatus of claim 35 wherein the connection means for interconnecting the head assembly to the body housing is a pivot assembly comprising a pivot pin extending through corresponding apertures in opposite sides of the body housing and the neck, the pivot pin pivotally connecting the head assembly to the body housing and allowing for movement of the head assembly relative to the body housing from a slight breeze.*

37. *The apparatus of claim 36 wherein the connecting means for connecting the tail to the body is a pivot assembly comprising a second pivot pin extending through corresponding apertures in opposite sides of the rear end of the body housing and the tail, the second pivot pin pivotally connecting the tail to the body housing and allowing for movement of the tail relative to the body housing even from a slight breeze.*

38. *The apparatus of claim 30 wherein the counterbalancing weight comprises a weighted arm.*

39. *The apparatus of claim 30 wherein the counterbalancing weight comprises an arm interconnected with the neck at one end and with a weight at the opposite end.*

40. *The apparatus of claim 30 wherein the head assembly can move from the intermediate position, forward or rearward along the range of motion.*

41. *The apparatus of claim 30 wherein the connection means includes a hook and a loop.*

42. *A decoy apparatus comprising: a body housing with a front end and a rear end; a tail assembly interconnected with the rear end of the body housing; connection means for interconnecting the tail assembly to the body housing which allows for movement of the tail assembly through a range of motion by wind, the connection means is a selectively connectable connection means allowing the tail assembly to be selectively connected and removed from the body housing; and counterbalancing means comprising a counterbalancing weight substantially equal to the weight of the tail assembly, attached to the tail assembly, for balancing the tail assembly at an intermediate position along the range of motion with respect to the body housing when the body housing is in a horizontal position so the tail assembly can move along the range of motion in response to wind and without any external force other than gravity.*

43. *The apparatus of claim 42 wherein the connection means includes a hook and a loop.*

44. *A decoy apparatus comprising:*
   *a body housing having a front end and a rear end;*
   *a head assembly interconnected with the front end of the body housing, the head assembly comprising a head and a neck;*
   *connection means for interconnecting the head assembly to the body housing which allows for movement of the head assembly through a range of motion by wind, the front end of the body housing includes a throat area, and the connection means comprises a hook extending from an upper portion of the throat area and a loop located on an upper surface of the neck, the loop being positioned on the hook to hang the head assembly from the body housing; and*
   *counterbalancing means comprising a counterbalancing weight substantially equal to the weight of the head assembly, attached to the head assembly, for balancing the head assembly at an intermediate position along the range of motion with respect to the body housing when the body housing is horizontally positioned, so the head assembly can move along the range of motion in response to wind and without any external force other than gravity.*

45. *A decoy apparatus comprising:*
   *a body housing having a front end and a rear end;* a head assembly interconnected with the front end of the body housing, the head assembly comprising a head and a neck;

connection means for interconnecting the head assembly to the body housing which allows for movement of the head assembly through a range of motion by wind;

counterbalancing means comprising a counterbalancing weight substantially equal to the weight of the head assembly, attached to the head assembly, for balancing the head assembly at an intermediate position along the range of motion with respect to the body housing when the body housing is horizontally positioned, so the head assembly can move along the range of motion in response to wind and without any external force other than gravity; and, a support stake having an upper end and a lower end, the upper end of the support stake extending into the body housing through a torso aperture in the body housing.

46. The apparatus of claim 45 further comprising a spring attached to the upper end of the support stake against a seat attached to an upper portion of the body housing within the body housing to allow for additional movement of the decoy in a plurality of directions.

47. A decoy apparatus comprising:

a body housing having a front end and a rear end;

a head assembly interconnected with the front end of the body housing, the head assembly comprising a head and a neck;

connection means for interconnecting the head assembly to the body housing which allows for movement of the head assembly through a range of motion by wind, the connection means for interconnecting the head assembly to the body housing compromises a hook located on an upper portion of the body housing and a loop connected to an upper side of the neck, the loop positioned on the hook to hang the head assembly from the body housing and allow for both horizontal and vertical movement of the head assembly with respect to the body housing;

counterbalancing means comprising a counterbalancing weight substantially equal to the weight of the head assembly, attached to the head assembly, for balancing the head assembly at an intermediate position along the range of motion with respect to the body housing when the body housing is horizontally positioned, so the head assembly can move along the range of motion in response to wind and without any external force other than gravity, a tail interconnected with the rear end of the body housing, connecting means for connecting the tail to the body housing, and a counterweight interconnected with the tail by a second arm attached to the tail, the second counterweight positioned within the body, the second counterweight balancing the tail.

48. The apparatus of claim 47 wherein the connecting means for connecting the tail to the body comprises a rear hook extending from the rear end of the body housing and a rear loop attached to the tail, the rear loop positioned on the rear hook to hang the tail from the body housing and allow for both horizontal and vertical movement of the tail with respect to the body housing.

49. A decoy apparatus comprising:

a body housing having a front end and a rear end;

a head assembly interconnected with the front end of the body housing, the head assembly comprising a head and a neck;

connection means for connecting the head assembly to the body housing which allows for movement of the head, by wind, both up and down and side to side with respect to the body housing, the connection means is a selectively connectable connection means allowing the head to be selectively connected and removed from the body housing; and counterbalancing means including an arm connected to the neck at one end, and a weight at the opposite end for balancing the head assembly with respect to the body housing at the connection means.

50. The apparatus of claim 49 wherein the counterweight is positioned within the body housing.

51. The apparatus of claim 49 wherein a sheet of plastic is attached to the body housing which can be blown up by wind to simulate the strutting of feathers.

52. A decoy apparatus comprising:

a body housing having a front end and a rear end;

a head assembly interconnected with the front end of the body housing, the head assembly comprising a head and a neck;

connection means for connecting the head assembly to the body housing which allows for movement of the head, by wind, both up and down and side to side with respect to the body housing, the front end of the body housing includes a throat area, and the connection means comprises a hook extending from an upper portion of the throat area and a loop located on an upper surface of the neck, the loop being positioned on the hook to hang the head assembly from the body housing; and counterbalancing means including an arm connected to the neck at one end, and a weight at the opposite end for balancing the head assembly with respect to the body housing at the connection means.

53. A decoy apparatus comprising:

a body housing having a front end and a rear end;

a head assembly interconnected with the front end of the body housing, the head assembly comprising a head and a neck;

connection means for connecting the head assembly to the body housing which allows for movement of the head, by wind, both up and down and side to side with respect to the body housing;

counterbalancing means including an arm connected to the neck at one end, and a weight at the opposite end for balancing the head assembly with respect to the body housing at the connection means; and a support stake having an upper end and a lower end, the upper end of the support stake extending into the body housing through a torso aperture in the body housing.

54. The apparatus of claim 53 further comprising a spring attached to the upper end of the support stake against a seat attached to an upper portion of the body housing within the body housing to allow for additional movement of the decoy in a plurality of directions.

55. A method for using a decoy to attract or scare away animals comprising the steps of:

forming a hollow decoy housing with an open front end;

attaching a hook to the housing above the open front end;

forming a head and neck assembly comprising a head and a neck;

attaching a loop to the neck;

attaching a counterweight, by means of an arm, to the head and neck assembly to balance the head and neck assembly in a neutral position;

hanging the head and neck assembly from the housing by placing the loop on the hook;

placing the decoy at a desired location to attract animals; and allowing the wind to move the head and neck assembly of the decoy.

56. The method of claim 55 further comprising the step of interconnecting the decoy with a support stake having a pointed edge for insertion into the ground to position the decoy at a desired location.

57. The method of claim 56 wherein the decoy is a fowl and the method further comprises attaching a plastic sheet decorated to resemble feathers to the housing such that wind will blow up the feathers to create the effect of strutting.

58. The method of claim 56 further comprising the steps of attaching a spring to an upper portion of the support stake, attaching a seat to an upper part of the body housing within the body housing, and placing the upper part of the support stake inside the body housing through an aperture in a bottom portion of the body housing.

59. The method of claim 55 wherein the decoy is an animal and the method further comprises attaching a rear hook to a rear end of the body housing, forming a tail, attaching a rear loop to the tail, and hanging the tail from the body housing by placing the loop on the hook.

60. The method of claim 59 further comprising the step of attaching a second counterweight to the tail by means of an arm.

* * * * *